Sept. 24, 1963
V. D. BARKER
3,104,416
EYEGLASS HINGES
Filed Dec. 8, 1961
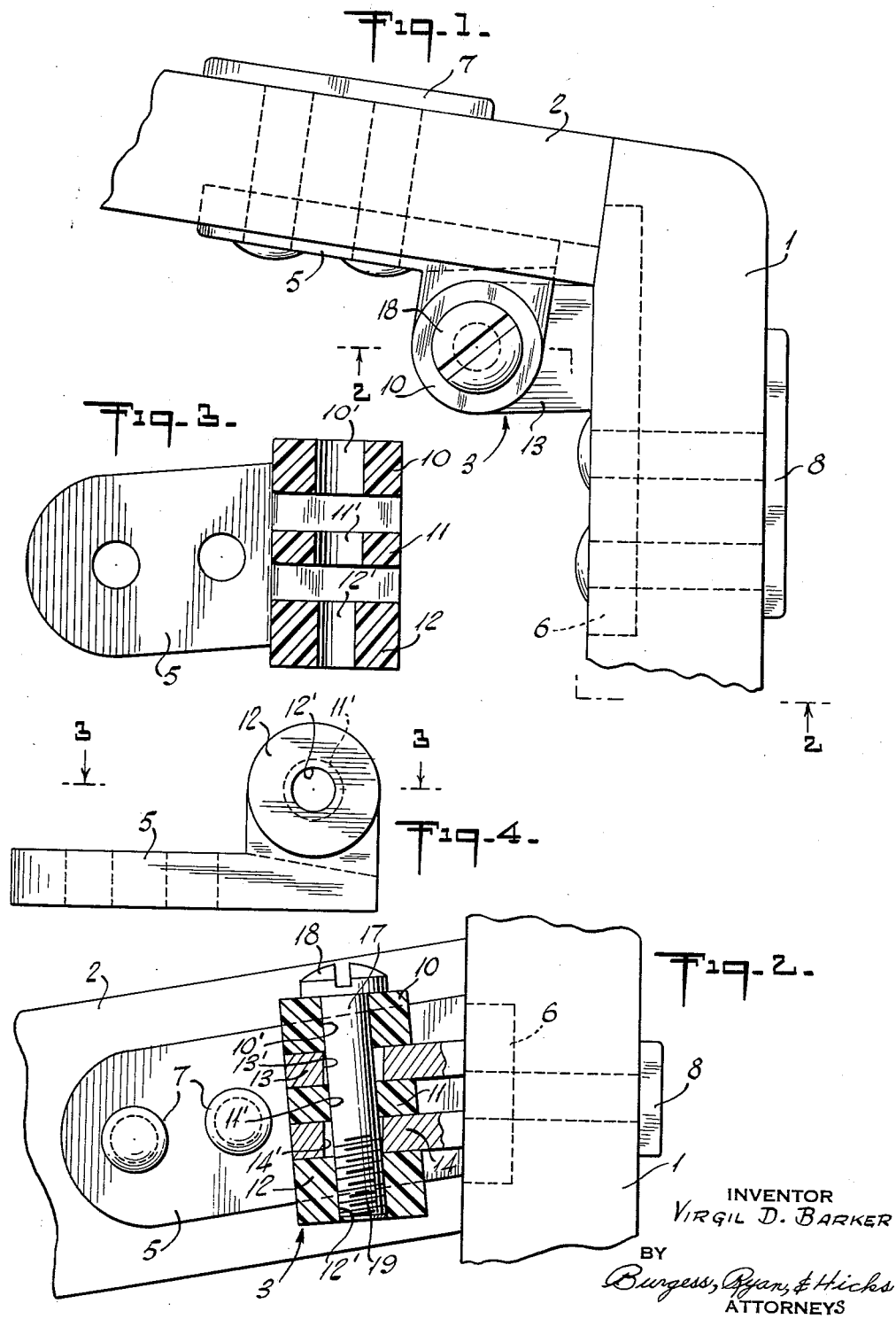
INVENTOR
VIRGIL D. BARKER
BY
Burgess, Ryan, & Hicks
ATTORNEYS

United States Patent Office 3,104,416
Patented Sept. 24, 1963

3,104,416
EYEGLASS HINGES
Virgil D. Barker, Westfield, N.J., assignor to Barker Engineering Corporation, Kenilworth, N.J., a corporation of New Jersey
Filed Dec. 8, 1961, Ser. No. 160,688
8 Claims. (Cl. 16—140)

This invention relates to eyeglass hinges.

In eyeglasses which have temples, hinges are customarily used to connect the temples with the lens frame part. The hinges allow the temples to be folded parallel with the lenses when the eyeglasses are not being worn. In some respects, the hinges also facilitate the establishment and the adjustment of the angularity of the temples with respect to the lenses, so that the eyeglasses will remain in place on the wearer, will be comfortable, and will keep the lenses in the correct position with respect to the eyes.

This application is a continuation-in-part of my co-pending application No. 686,364 filed September 26, 1957, now abandoned.

Eyeglass hinges, which are necessarily small, are subjected to rigorous service. It has been estimated that in a five-year period the average eyeglass wearer will have fully folded and unfolded the temples a total of over 60,000 times. Additionally, there may be a large number of slight angular adjustments of the temples. Throughout the life of the hinge, if it is to remain satisfactory, the hinge must retain a substantially fine machine fit and accuracy.

In order that the lenses shall be held accurately with respect to the wearer's eyes, it is necessary that the hinge shall prevent any substantial rocking of the temple in a vertical plane. To give the eyeglasses as a whole a lateral stability, so that they do not tend to cock out of the general plane in which the lenses should be positioned with respect to the wearer's eyes, it is necessary that the hinges present a certain amount of resistance to the turning of the temples with respect to the lenses or lens-holding frame. Both these properties of the hinge should remain substantially unimpaired throughout many thousands of opening and closing movements of the hinge.

In addition to the above requirements and desiderata, there are also those of small size, neatness, and simplicity of structure, which are almost as important. It is, of course, also highly desirable that the hinge shall require substantially no maintenance over a long life, and that the resistance to turning of the temple imposed by the hinge shall not vary markedly throughout the life of the frame.

An object of the present invention is to produce an eyeglass hinge which will remain tight yet smooth in operation even after many thousands of opening and closing operations.

Another object is to produce a hinge which has a screw pintle which will remain tight and in place indefinitely and will not loosen and "back out" as do the screws in conventional eyeglass hinges.

Another object is to construct a hinge which can be bent to adjust the pantoscopic angle of the lenses as is the present practice of opticians and optometrists.

Still anther object is to make a hinge which has a screw pintle but needs no thread tapped into a barrel during manufacture of the hinge, thus the advantages of a screw to adjust for friction and wear are obtained but the manufacturing step of tapping a screw thread in a barrel is dispensed with.

A further object is to make a hinge with the above advantages but which retains the advantage of a screw pintle which can be tightened, removed and replaced.

A still further object is to make a hinge which need not be machined to such close tolerance as the conventional all-metal hinge.

In accordance with one form of the present invention, the eyeglass hinge comprises two portions, one being an integral piece of nylon and the like having two barrels and the other portion having one barrel made of metal. The metal barrel meshes with and lies between the nylon barrels. A pintle passes through the barrels and has a head engaging one of the plastic barrels and a threaded portion engaging the other plastic barrel.

The novel features of this invention, both as to its structure and method of operation as well as additional objects and advantages thereof, will be understood more readily from the following description, when read in connection with the accompanying drawings in which:

FIG. 1 is a fragmentary plan view showing a portion of the lens frame and temple and the connecting hinge;

FIG. 2 is a section through 2—2 of FIG. 1;

FIG. 3 is a section through 3—3 of FIG. 4; and

FIG. 4 is a plan view of the plastic portion of the hinge.

Referring now to the drawings:

One end of a lens frame designed to hold the lenses is shown at 1. At 2 is a temple hinged to the lens frame 1 by means of hinge 3. The lens frame and temple are conventional. The temple is of the kind commonly known as a butt end temple. The hinge 3 comprises a temple portion 5 and a front frame portion 6. The portion 5 is riveted to the temple 2 by the rivet assembly 7 and the portion 6 is riveted to the front frame by means of rivet assembly 8.

Eyeglasses hinges of this character are equipped with bearing knuckles or barrels which are designed to intermesh and to receive the pintle of the hinge therethrough. Such hinges are designated by the number of barrels they carry. There may be two, three, five or seven barrels. In the drawing I have illustrated what is known as a five barrel hinge.

In order to obtain the advantages set forth above, one hinge portion is made of nylon which is sold by E. I. du Pont de Nemours & Company under the trademark "Zytel" or some other material having similar characteristics.

Tests have been performed comparing nylon with a number of such other materials and it has been determined that in order for a material to operate properly as an eyeglass hinge within the spirit of the invention, the material must have the following characteristics:

(1) Elastic recovery from substantial distortion by compressive stress, so that the material will take up wear between the barrels.

(2) Substantially rigid, but plastically deformable and having little or no brittleness, so that it does not crack or rupture in this use.

(3) Wear resistant so as to maintain the tightness of the hinge even after a great deal of use and particularly abrasive resistant so that dust or other gritty contamination which may work its way into the areas between the barrels will not cause undue wear of the surface of the material.

(4) Temperature stable in order that the nylon or equivalent portion of the hinge will not lose its shape when subjected to a temperature of 212° F., the temperature to which eyeglass frames and temples are subjected for bending to fit a particular wearer.

(5) A coefficient of friction which permits tightness between the barrels even after repeated use. If the coefficient is too low, the temples will swing too freely, while if the coefficient is too high, it will be impossible to swing the temples relative to the frame without bending.

The following are two materials which have been tested and found to possess all of the above identified characteristics and to operate satisfactorily.

(1) An acetal sold by the E. I. du Pont de Nemours & Company under the trademark "Delrin."

(2) A polycarbonate sold by the General Electric Company under the trademark "Lexan."

The above list is not to be taken as limiting since many other materials which have the above stated characteristics are being developed or are in existence which would function properly.

With the construction described herein, hinges have been subjected to 200,000 90° swings and were still tight. It is well known that the conventional all-metal hinges begin to show signs of looseness due to wear after 3,000–5,000 90° swings.

The temple hinge portion which is made of nylon or other suitable plastic comprises three barrels shown at 10, 11 and 12. The front portion 6 of the hinge 3 comprises two barrels shown at 13 and 14 (FIG. 2). Each front frame barrel has a circular hole therethrough shown, respectively, at 13' and 14'. This portion of the hinge is made of metal so that it may be bent to adjust the glasses to the wearer. The pintle of the hinge is in the form of a metal screw shown at 17 and has the usual slotted head 18 and screw threads 19 at the opposite end of the head.

In the present invention, the hinge is constructed so that the nylon portion 5 has the greater number of barrels and, therefore, it will enclose the barrels of the metal portion of the hinge. The result is that the uppermost and lowermost barrels of the assembly hinge are of nylon. One of the outer barrels (the lowermost one as shown) of the nylon portion of the hinge is equipped with a hole diameter substantially the same as the base of the thread 19 of the pintle screw 17, so that when the hinge is assembled and the pintle screw screwed down into place, the metal screw threads 19 will form complementary threads into the nylon barrel having the hole diameter substantially the same as the base of the thread.

In the embodiment shown in the drawings, the barrels 10 and 11 of the hinge portion 5 are equipped with central holes 10' and 11' of substantially the same diameter as the pintle screw. The barrel 12 is equipped with a hole 12' of a diameter substantially equal to the diameter of the base of the thread 19 of the pintle screw 17.

In FIG. 2 there is illustrated an adaptation wherein the holes in the barrels 13 and 14 of the front portion 6 of the hinge have an axis which is angularly disposed to the axis of the pintle screw 17 and the axis of the holes 10', 11' and 12' in the nylon hinge portion 5. This is to illustrate that the hinge which is the subject matter of the present invention will function properly even though the holes through the various barrels do not have a common axis. Of course, it is perfectly satisfactory if they do not have the same axis but the fact that the present hinge can function properly even though the holes through the various barrels do not coincide means that manufacturing tolerances need not be close and even though the barrels of the metal portion 6 of the hinge are bent at other than a right angle to the leaf of the hinge portion 6, the present hinge will function quite satisfactorily. This is of great advantage not only in manufacturing but also because it gives the optician who fits the glasses a reasonable leeway in adjusting them without in any way impairing the proper operation of the hinge.

It will also be seen that because it is unnecessary to equip the barrel 12 with internal threads the manufacturing operation is simplified. Because of the elastic characteristics of the nylon or like material, the metal screw pintle 17 is able to form its own thread in the barrel 12 and will not subsequently tend to unscrew. It will not loosen up in use because the nylon closely embraces the threads and holds the screw from backing out. It will also be seen upon examination of FIG. 2 that there is considerable area of contact between the barrels of the nylon portion 5 and the barrels of the metal portion and that the screw serves to create and maintain a desirable frictional engagement between these elements. This is readily accomplished because of the characteristic of the nylon and this engagement is maintained despite many thousands of hinge operations as glasses are used by the owner.

The present construction as illustrated in the drawings is very advantageous because it does not depart too far from the conventional and standard forms. The hinge which is the subject matter of this application has the general form and operation of the conventional metal hinge and can be adjusted like the conventional hinge as this is necessary in fitting the eyeglasses. All this is important because those who deal with the manufacturing and fitting of eyeglasses have acquired certain skills and routines which it is desirable not to disturb. No special tools or instrumentalities are required to adjust eyeglasses equipped with the hinge of the kind described herein.

Although I have described specific examples and show the same in accompanying drawings, and although I have given various specific preferences, recommendations and alternatives, it is to be understood that these are not exhaustive or limiting of my invention, but are illustrative and for the purposes of instructing others in the principles of the invention.

What is claimed is:

1. An eyeglass hinge comprising two portions,
   (a) one said portion having two barrels and being an integral piece of a first material having the following characteristics,
      (1) elastic recovery from substantial distortion by compressive stress,
      (2) substantially rigid but plastically deformable and having little or no brittleness,
      (3) wear and abrasive resistant,
      (4) temperature stable up to a temperature of 212° F., and
      (5) a coefficient of friction which permits tightness between the barrels even after repeated use,
   (b) the other of said portions being an integral piece of metal having one metal barrel meshing with and lying between the barrels of said first material, and
   (c) a pintle passing through the barrels, said pintle having a head engaging one barrel of first material and a threaded portion engaging the other barrel of first material.

2. The eyeglass hinge of claim 1 wherein the integral portion of first material is for attachment to the temple piece of the eyeglass.

3. An eyeglass hinge comprising two portions,
   (a) one said portion having an inner barrel and two outer barrels and being an integral piece of a first material having the following characteristics,
      (1) elastic recovery from substantial distortion by compressive stress,
      (2) substantially rigid but plastically deformable and having little or no brittleness,
      (3) wear and abrasive resistant,
      (4) temperature stable up to a temperature of 212° F., and
      (5) a coefficient of friction which permits tightness between the barrels even after repeated use.
   (b) the other of said portions being an integral piece of metal having two metal barrels, the metal barrels meshing with the barrels of first material,
   (c) each metal barrel having a barrel of first material on either side thereof, and
   (d) a pintle passing through the barrels, said pintle having a head engaging one outer barrel of first material and a threaded portion engaging the other outer barrel of first material.

4. The hinge of claim 3 wherein the portion of first material is adapted for attachment to the temple piece of the eyeglass.

5. The hinge of claim 3, wherein the barrel of a first material engaged by the threaded portion of the pintle has a central hole having a diameter when the pintle is not in place substantially equal to the diameter of the base of the pintle thread and grips the pintle firmly when said pintle is in place, preventing relative rotation between said barrel and said pintle during relative movement of the hinge portion.

6. An eyeglass hinge comprising two portions,
  (a) one of said portions made of a first material having the following characteristics,
    (1) elastic recovery from substantial distortion by compressive stress,
    (2) substantially rigid but plastically deformable and having little or no brittleness,
    (3) wear and abrasive resistant,
    (4) temperature stable up to a temperature of 212° F., and
    (5) a coefficient of friction which permits tightness between the barrels even after repeated use,
  (b) the other of said portions being made of metal,
  (c) a pluraltiy of barrels on the portion made of first material meshing with a barrel on the portion made of metal, the outermost barrels being made of first material, and
  (d) a pintle through the meshed barrels compressing at least one barrel of first material against the metal barrels.

7. The hinge of claim 6 in which an outermost barrel of first material has portions substantially equal in diameter to the base of screw threads on the pintle before assembly of the hinge so that on assembly the threads are tightly gripped by said outermost barrel of first material.

8. The hinge of claim 6 wherein the hinge portion made of metal has a plurality of barrels.

References Cited in the file of this patent

UNITED STATES PATENTS

| 2,305,562 | Thompson et al. | Dec. 15, 1942 |
| 2,428,645 | Bausch | Oct. 7, 1947 |
| 2,587,870 | Marsters | Mar. 4, 1952 |
| 2,802,503 | Zupa | Aug. 13, 1957 |
| 2,828,668 | DeAngelis | Apr. 1, 1958 |

FOREIGN PATENTS

| 540,883 | Great Britain | Nov. 4, 1941 |

OTHER REFERENCES

Wakeman: "The Chemistry of Commercial Plastics," chapter 12, published by Reinhold Publishing Corp., 330 W. 42nd St., New York, N.Y., 1947.

"Delrin" acetal resin, page 38, par. 13, published by Polychemicals Dept., E. I. du Pont de Nemours & Co., Inc., Wilmington 98, Delaware, June 1957.